United States Patent
Ottesen et al.

(10) Patent No.: US 6,392,841 B1
(45) Date of Patent: May 21, 2002

(54) METHOD AND APPARATUS FOR RESTORING A THERMAL RESPONSE OF A MAGNETORESISTIVE READ TRANSDUCER

(75) Inventors: Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,085

(22) Filed: Jul. 16, 1999

(51) Int. Cl.[7] .............................. G11B 5/02; G11B 5/09; G11B 20/10
(52) U.S. Cl. ........................ 360/137; 360/46; 360/67; 360/25
(58) Field of Search .......................... 360/137, 67, 25, 360/46, 75; G11B 20/10, 5/09, 5/02

(56) References Cited

U.S. PATENT DOCUMENTS

| | | | |
|---|---|---|---|
| 5,168,413 A | | 12/1992 Coker et al. ................. 360/137 |
| 5,739,972 A | * | 4/1998 Smith et al. .............. 360/77.03 |
| 5,751,510 A | | 5/1998 Smith et al. .................. 360/67 |

* cited by examiner

*Primary Examiner*—David Hudspeth
*Assistant Examiner*—Dan I. Davidson

(74) *Attorney, Agent, or Firm*—Mark A. Hollingsworth

(57) ABSTRACT

A method and apparatus for processing a readback signal obtained from a storage medium using a magnetoresistive (MR) element restores a thermal signal component of the signal. A readback signal obtained from the storage medium comprises a thermal component representing a thermal response of the MR element, and may further comprise a magnetic component representing servo or user data. The readback signal is filtered so as to degrade the thermal component of the signal, typically by amplification circuitry exhibiting a highpass filtering behavior. The highpass filtered readback signal is further filtered using a lowpass filter. The filtered signal is sampled, and a sliding window comprising a series of binary values is applied to groups of the signal samples to produce a plurality of signal sample values for each of the signal sample groups. The signal sample values for each of the signal sample groups are summed to produce a restored thermal signal substantially representative of the thermal component of the readback signal. A highpass magnetic readback signal may also be operated on to produce a restored thermal component. A sampled ternary signal is produced by a recording channel using the readback signal as an input. A sliding window is applied to groups of the ternary signal samples to produce signal sample values for each of the ternary signal sample groups. The signal sample values are summed for each of the ternary signal sample groups to produce a restored thermal signal substantially representative of the thermal component of the readback signal.

37 Claims, 9 Drawing Sheets

METHOD AND APPARATUS FOR RESTORING A THERMAL RESPONSE OF A MAGNETORESISTIVE READ TRANSDUCER

FIELD OF THE INVENTION

The present invention relates generally to data storage systems and, more particularly, to a system and method for restoring a thermal response of a magnetoresistive read transducer.

BACKGROUND OF THE INVENTION

A typical data storage system includes a magnetic medium for storing data in magnetic form and a transducer used to write and read magnetic data respectively to and from the medium. A typical disk storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation. The distance between the head and the disk surface, which is typically on the order of 40–100 nanometers (nm), is commonly referred to as head-to-disk clearance or spacing.

Within the data storage system manufacturing industry, much attention is presently being focused on the use of a magnetoresistive (MR) element as a read transducer. A typical MR head, for example, incorporates an MR read element and a thin-film write element. MR element transducers, however, are known to introduce a distortion in the sensed magnetic signal, which typically represents user data or servo information stored on a magnetic storage disk. Such a distortion in a readback signal obtained by an MR transducer has heretofore been treated as undesirable low frequency noise, and as such, has been subject to high pass filtering in an attempt to mitigate the distortion.

It is well known, for example, that many data storage disk drive systems that employ MR heads utilize highpass filtering of the magnetic readback signals to block unwanted baseline modulation associated with the thermal response of the MR head. This undesirable thermal response generally interferes with the reliable operation of the recording channel, which is used for processing the magnetic signal portion of the readback signal. This "unwanted" thermal signal component of a magnetic readback signal, however, has been found to be quite useful for purposes of analyzing the flying characteristics of the airbearing slider and detecting disk surface defects, among other uses. The loss of the thermal response due to the blocking effect of the highpass filtering process generally renders the thermal component of a magnetic readback signal unusable.

There exists a need in the data storage system manufacturing community for an apparatus and method for restoring the thermal response of a highpass filtered magnetic readback signal. There exists a further need to obtain a highpass filtered thermal signal without interfering with the magnetic readback signal. The present invention is directed to these and other needs.

SUMMARY OF THE INVENTION

The present invention is directed to an apparatus and method for processing a readback signal obtained from a storage medium using a magnetoresistive element, and restoring a thermal signal component of the signal. A readback signal is obtained from the storage medium using an MR element. The readback signal comprises a thermal component representing a thermal response of the MR element, and may further comprise a magnetic component representing servo or user data. The readback signal is filtered so as to degrade the thermal component of the signal, typically by amplification circuitry exhibiting a highpass filtering behavior.

In one embodiment, the highpass filtered readback signal is subsequently filtered using a lowpass filter, such as by use of an anti-alias lowpass filter. The filtered signal is sampled to produce samples of the filtered signal. A sliding window comprising a series of binary values is applied to groups of the signal samples to produce a plurality of signal sample values for each of the signal sample groups. The signal sample values for each of the signal sample groups are summed to produce a restored thermal signal substantially representative of the thermal component of the signal obtained from the storage medium.

The sliding window comprises a series of binary zeros and binary ones, and the ordering of the series of binary zeros and binary ones differs for each of the groups of the signal samples to which the sliding window is applied. The sliding window has a preestablished length, and the signal sample groups are separated by a preestablished number of signal samples. The sliding window is applied to mask the sampled signal so as to progressively slide the window by a preestablished number of signal samples.

Applying the sliding window to the signal samples involves multiplying the series of binary values defining the sliding window with the signal samples of each of the signal sample groups. The summed signal sample values are arranged as a sequence of summed values, the summed values being representative of portions of the restored thermal signal. An interpolation operation is performed on the sequence of summed values to produce the restored thermal signal. The restored thermal signal may be used for a variety of operational and diagnostic functions, such as detecting a surface feature of the storage medium.

In accordance with another embodiment, a magnetic readback signal provided at an output of an amplification circuit that exhibits a highpass filtering behavior may be operated on to produce a restored thermal component. In this embodiment, the signal obtained from the storage medium comprises a magnetic component in addition to a thermal component. A ternary signal is produced using the signal obtained from the storage medium, such as by use of a recording channel analyzer coupled to the recording channel.

The ternary signal is sampled to produce samples of the ternary signal by the recording channel analyzer. A sliding window is applied to groups of the ternary signal samples to produce a plurality of signal sample values for each of the ternary signal sample groups. The signal sample values are summed for each of the ternary signal sample groups to produce a restored thermal signal substantially representative of the thermal component of the signal obtained from the storage medium.

An apparatus for restoring a thermal component of a readback signal employed in an information storage device includes a transducer comprising a magnetoresistive element for reading a signal from a storage medium. The readback signal comprises a thermal component representing a thermal response of the MR element. An amplification circuit, coupled to the transducer and preferably provided in an arm electronics module, alters the readback signal such that the thermal component is degraded. A sampling circuit, coupled to the amplification circuit, samples the altered signal to produce samples of the altered signal.

A processor, coupled to the sampling circuit, applies a sliding window comprising a series of binary values to groups of the signal samples to produce a plurality of signal sample values for each of the signal sample groups. The processor further sums the signal sample values for each of the signal sample groups to produce a restored thermal signal substantially representative of the thermal component of the signal obtained from the storage medium. The apparatus may be incorporated in-situ a disk drive system.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
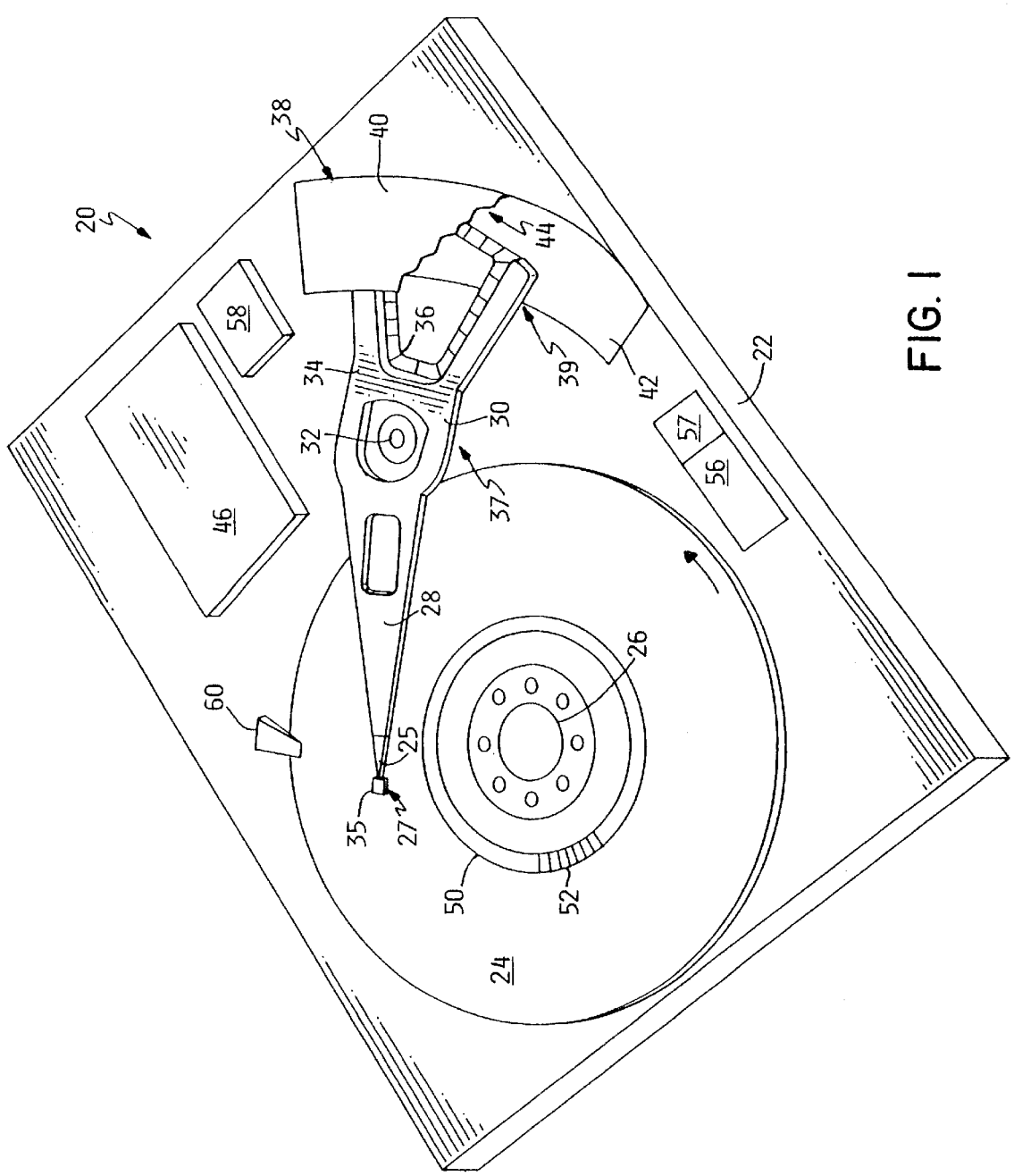
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 2:
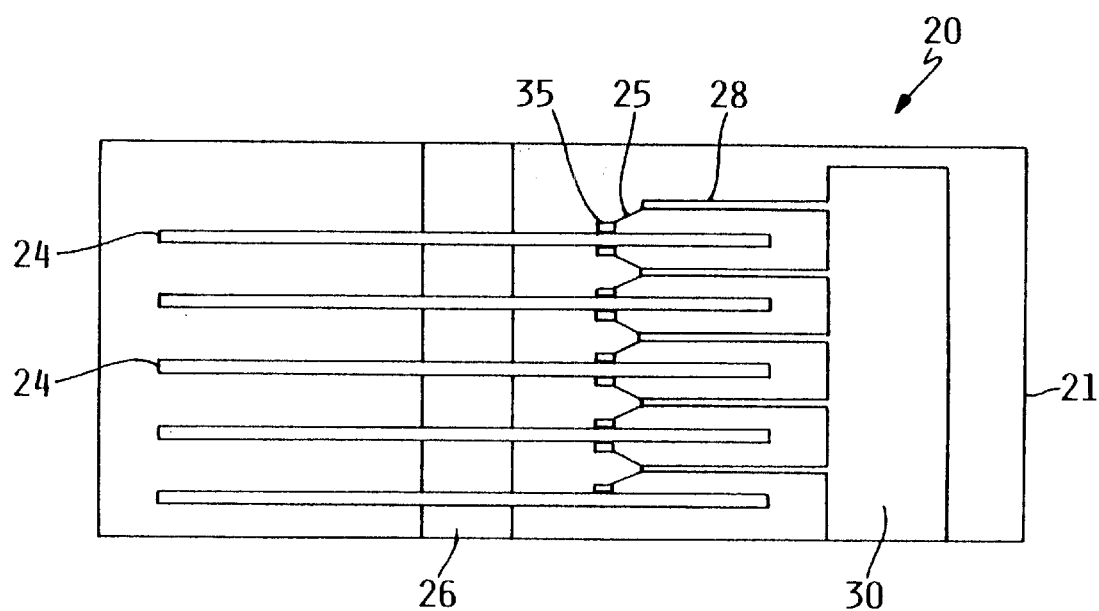
FIG. 2 is a side plan view of a disk drive system comprising a plurality of data storage disks.

Referring to the drawings, and more particularly to FIGS. 1 and 2, there is illustrated a data storage system 20 within which a thermal response restoration methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

A system and method in accordance with the principles of the present invention generally provide for restoring a thermal signal of a readback signal obtained from a storage medium which has been altered by the frequency response of circuitry used to amplify the readback signal. A system and method according to the present invention is well suited for implementation in-situ a disk drive system of the type described above with reference to FIGS. 1 and 2, it being understood that the invention is not limited to the operating environment described in the above discussion.

Figure 3:
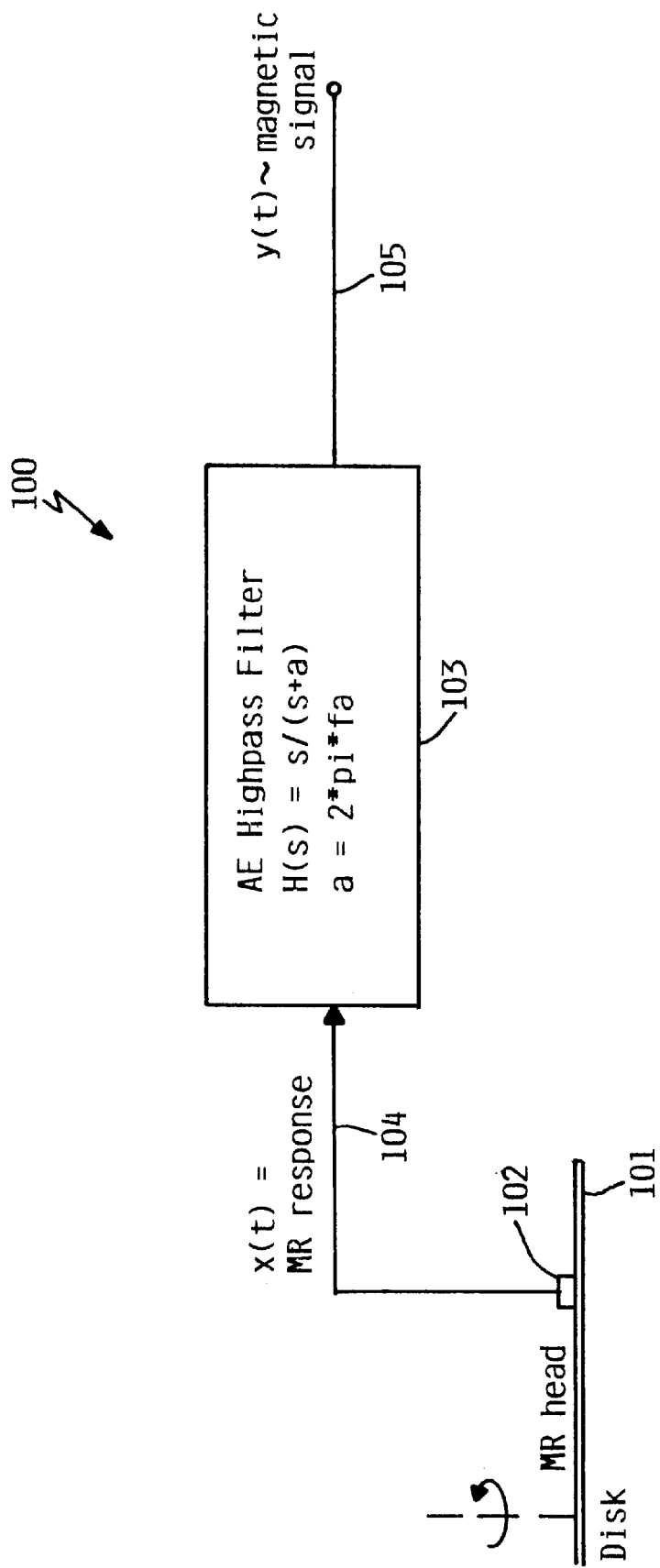
FIG. 3 is a block diagram of circuitry used to process readback signals which is provided in a typical data storage system.

Referring now to FIG. 3, there is illustrated a block diagram of circuitry used to process readback signals which is provided in a typical data storage system. A readback signal, x(t), is obtained from a magnetized location of data storage disk 101 using MR head 102, which is depicted as flying above rotating disk 101. The readback signal, x(t), represents the response of an MR element provided in MR head 102. It is known that a readback signal obtained from a magnetized portion of data storage disk 101 includes a thermal signal component in addition to a magnetic signal component. Reference is made to co-owned U.S. Pat. No. 5,751,510 which provides additional details concerning the identification, processing, and uses of the thermal signal component of a readback signal. U.S. Pat. No. 5,751,510 is hereby incorporated herein by reference in its entirety.

It is well known that many manufacturers of hard disk drive systems that incorporate MR heads employ a highpass filter in the amplification circuitry which is coupled to an MR head. The amplification circuitry is typically provided in an arm electronics (AE) module 103. The highpass filtering behavior of AE module 103 significantly degrades the low frequency thermal component of the readback signal, and effectively blocks the low frequency thermal response from the magnetic readback signal component, y(t), provided at the output 105 of AE module 103. The thermal signal component of a readback signal is typically observed in the form of baseline wander or DC modulation.

The readback signal, x(t), produced in the MR element 102, is amplified by the AE module 103. The highpass filtering behavior of AE module 103 distorts the phase and amplitude of the thermal signal component of the readback signal, x(t). This thermal signal component distortion varies in severity depending on the frequency and phase response of the particular AE module 103 employed. The thermal signal component in known to interfere with the reliable operation of the recording channel which is used for processing the magnetic signal component of a readback signal.

The cut-off frequency, $f_a$, of a typical AE highpass filter is currently about 3.5 MHz. However, it is believed that future data storage disk systems will employ MR-like heads which may necessitate AE highpass filter cut-off frequencies on the order of 10 MHz. It will be appreciated by those skilled in the art that an AE highpass filter having a cut-off frequency of 3.5 MHz significantly degrades the relatively low frequency thermal signal component of a readback signal. It will be further appreciated that the blocking effect of an AE highpass filter having a cut-off frequency of about 10 MHz severely degrades the thermal signal component of a readback signal.

As was discussed previously, the thermal signal component may be advantageously used for a variety of operational, performance, and reliability purposes in a data storage system. The loss of the thermal signal component of a readback signal due to the blocking effect of an AE highpass filter precludes the ability to use the thermal response of an MR element for such purposes, including, for example, for performing head-disk-interference (HDI) analysis and predictive failure analysis (PFA).

By way of example, the stationary presence of an airbearing slider resonance frequency in the thermal response of an MR head on a given track is usually indicative of detrimental physical contact between a slider of an MR head 102 and a defect protruding from the surface of a data storage disk 101. The airbearing resonance frequency of a typical pico-slider used in state-of-the-art disk drive systems is about 160 kHz. An AE highpass filter with a cut-off frequency of 3.5 MHz will attenuate the thermal response containing the airbearing resonance by a factor of 0.046 or 26.8 dB.

If the AE highpass cut-off frequency is moved out to 10 MHz, the attenuation of the airbearing resonance contained in the thermal response will be 0.016 or 35.9 dB. The degraded thermal response, particularly in the case of an AE highpass cut-off frequency of 10 MHz, is so attenuated that it is virtually useless for purposes of detecting the presence of airbearing frequencies without the use of substantial amplification.

A method and apparatus implemented in accordance with the principles of the present invention effectively restores the thermal response of a readback signal subject to highpass filtering, such as by an AE module 103 or amplification circuitry exhibiting a highpass filtering behavior. Moreover, restoring the thermal response of a readback signal subject to highpass filtering in accordance with the present invention is accomplished without interfering with the magnetic readback signal, y(t).

A thermal response restoration approach consistent with the principles of the present invention employs a summation methodology, referred to herein as periodic segmented summation (PSS), which effectively performs integration-like operations on selected groupings of readback signal samples to restore a thermal response of a highpass filtered readback signal. The PSS approach of the present invention represents an elegant and simple technique (i.e., low processing overhead) which can be implemented in-situ a disk drive system. Employment of a PSS approach uses a fast summation and indexing methodology instead of costly amplifiers, filters, and trapezoidal integrators which would otherwise be needed to restore the thermal component of a readback signal.

Figure 4:
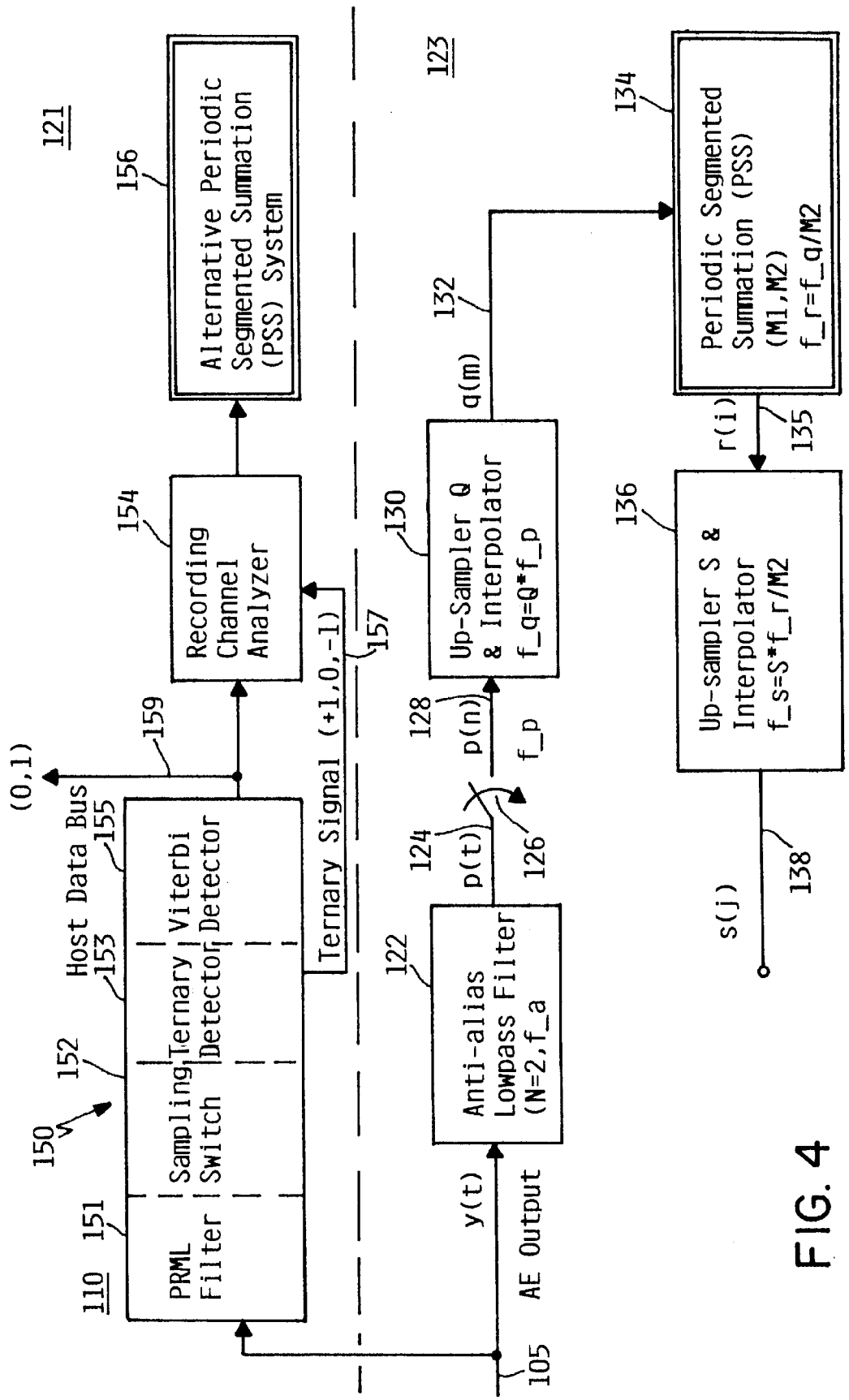
FIG. 4 a block diagram of an apparatus in accordance with the principles of the present invention for restoring a thermal signal substantially representative of a thermal component of a readback signal obtained from a data storage medium which has been subject to highpass filtering by amplification circuitry.

Referring now to FIG. 4, there is illustrated a block diagram of an apparatus for restoring a thermal signal substantially representative of a thermal component of a readback signal obtained from a data storage medium which has been subject to highpass filtering by amplification circuitry, such as amplification circuitry provided in AE module 103 shown in FIG. 3. A periodic segmented summation approach of the present invention may be practiced separately on either or both of the thermal and magnetic signal responses of an MR head.

FIG. 4 is shown to include two portions 121, 123 separated by a dashed line. The components of portion 121 represent the elements involved in processing a magnetic signal response from an MR head using PSS techniques of the present invention, while portion 123 represents various elements involving the application of PSS techniques on the thermal signal response of the MR head. The portion 121 of system 110 comprises standard components which are already present within a typical disk drive system. As such, a fully in-situ PSS methodology may be implemented in a disk drive system using the components of portion 121. The components of portion 123 of system 110 may be designed into a disk drive system so as to provide a fully in-situ PSS analysis capability. Alternatively, the components of portion 123 may be provided within test equipment external to the disk drive system.

Figure 5:
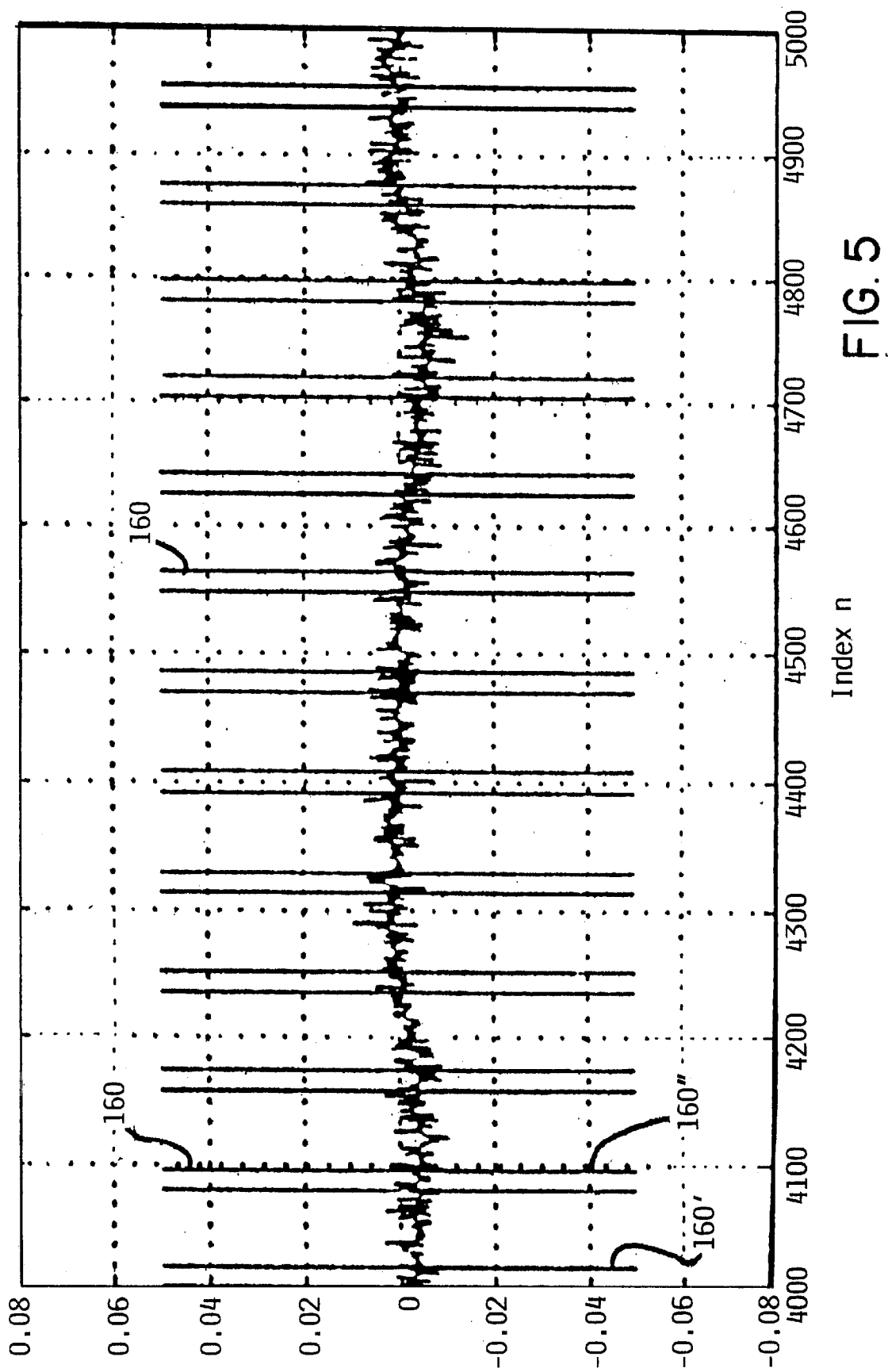
FIG. 5 is representative of a small portion of an up-sampled MR readback signal which is subject to a periodic segmented summation process for restoring a thermal signal component of the MR readback signal according to the present invention.

In general, the PSS methodology of the present invention may be viewed as an integration technique that uses a number of binary masks as sliding windows, such as windows 160 shown in FIG. 5, which are selectively applied to different segments of a sampled readback signal. The binary masks are defined to include a number of binary "1's" and a number of binary "0's". Each mask has a specific ordering of binary "1's" and "0's", such that the series of binary "1's" corresponds in position and length to the sliding windows 160 shown in FIG. 5, with all other values of the mask taking on binary "0" values.

By way of example, a first binary mask associated with the first window 160' shown in FIG. 5 comprises 16 binary "1's" followed by 984 binary "0's" for the 1,000 readback signal samples depicted in FIG. 5. The first window 160' thus defines a window having a length of M1=16. Assuming that the sliding windows 160 have a center-to-center separation of M2=78 samples, the second binary mask 160" comprises 78 binary "0's" followed by 16 binary "1's" and then 906 binary "0's". It can been seen that the series of binary "1's" of length M1 is progressively shifted by M2 number of samples to define each of the 13 windows of length M1 shown in FIG. 5.

Figure 6:
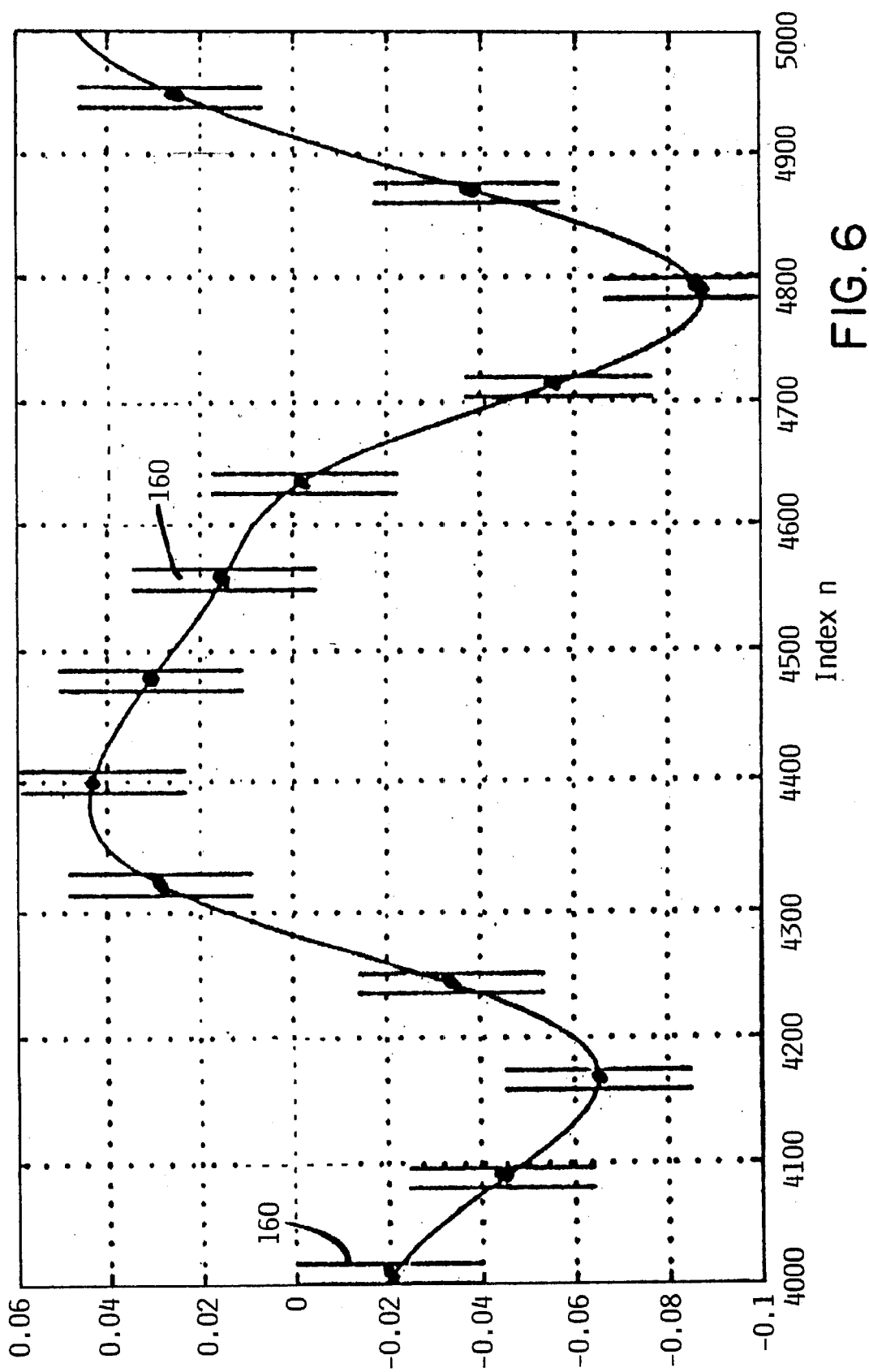
FIG. 6 is representative of a restored thermal signal resulting from application of a periodic segmented summation process of the MR readback signal depicted in FIG. 5.

An in-place multiplication operation is performed using each of the binary masks, such as window 160', and the samples of each of the separated segments, such as the 16 samples defined within window 160', of the sampled signal. The results of each of the individual multiplication operations for n number of samples for a given segment are then summed and stored. The summed values are subject to interpolation to produce the restored thermal signal, an example of which is shown in FIG. 6.

Processing of the thermal signal response from an MR head using PSS techniques according to an embodiment of the present invention will now be described with continued reference to FIG. 4. A magnetic signal, y(t), is received from an AE module exhibiting a highpass filter behavior, such as that described previously with respect to AE module 103 shown in FIG. 3. It is assumed that the signal, y(t), produced at the output 105 of AE module 103 has a degraded thermal signal content due to the highpass filter response of AE module 103. The magnetic signal, y(t), produced at the output 105 of AE module 103 is applied to the input of a lowpass filter 122.

Lowpass filter 122 is employed to remove high frequency content of the magnetic signal, y(t), since, as previously discussed, portion 123 of the block diagram 110 of FIG. 4 is associated with processing the thermal signal response of an MR head using PSS techniques of the present invention. In one embodiment, lowpass filter 122 is configured as an analog anti-alias lowpass filter which produces a filtered output signal, p(t), at the output 124 of lowpass filter 122. Anti-alias lowpass filter 122 is shown in FIG. 4 as a second order (i.e., N=2) low pass filter with a cutoff frequency, $f_a$, of less than half of the sampling frequency, $f_p$.

The anti-alias filtered output signal, p(t), produced at the output 124 of lowpass filter 122 is sampled by a sampling switch 126 at a sampling rate of $f_p$ samples per second to produce a sampled signal, p(n). It is noted that sampling switch 126 is generally representative of an analog-to-digital converter. It is further noted that the parenthetical term "n" of the sampled signal, p(n), represents a sampling index associated with sampling switch 126. Different indices are used to denote different sampling rates within the context of the embodiment shown in FIG. 4. A typical sampling rate associated with sampling switch 126 is 1.25 MHz, which is a relatively low sampling rate for purposes of reducing manufacturing cost.

The sampled signal, p(n), produced at the output of sampling switch 126 is applied to the input 128 of an up-sampler/interpolator 130. The sampled signal, p(n), applied to the input 128 of up-sampler/interpolator 130 is up-sampled to provide an signal, q(m), at the output of up-sampler/interpolator 130, which is sampled at a rate of $f_q = Q * f_p$, where Q is preferably on the order of 10 or 100. The sampled signal, q(m), produced by up-sampler/interpolator 130 is applied to the input of PSS unit 134. The sampled signal, q(m), is subject to periodic segmented summation processing by PSS unit 134.

PSS unit 134 employs a periodic segmented summation methodology consistent with the principles of the present invention to produce a restored thermal signal which is substantially representative of the thermal signal component of the readback signal, x(t), obtained from an MR transducer. In accordance with one embodiment, small segments of samples of the signal, q(m), produced by up-sampler/interpolator 130 are summed on a periodic basis by PSS unit 134. The small segments of the signal, q(m), are captured within a sliding window having a pre-established length, M1. The sliding window is applied along the sequence q (m) in a periodic fashion.

More particularly, the periodic application of the sliding window to the sequence q(m) centers the window every M2 samples, where M2>M1. For each periodic application of the sliding window, the window content is summed and stored in a sequence, r(i). The sequence, r(i), produced at the output 135 of PSS unit 134 is communicated to an up-sampler/interpolator 136. Up-sampler/interpolator 136 reconstructs, through interpolation, the thermal signal component of the original readback signal, x(t). The restored thermal signal, which is indicated as thermal signal, s(j), is produced at the output 138 of up-sampler/interpolator 136.

FIGS. 5 and 6 demonstrate the efficacy of the implementation depicted in FIG. 4 which employs a periodic segmented summation methodology consistent with the principles of the present invention. The waveform illustrated in FIG. 5 is representative of a small portion of an up-sampled MR readback signal, q(m), which is produced at the output of up-sampler/interpolator130 and operated on by PSS unit 134. The MR readback signal, q(m), shown in FIG. 5 was obtained from an erased data sector on a data storage disk and includes a manufactured surface bump.

In this illustrative example, the sampling rate, $f_q$, was set at 100 MHz. The MR head was situated at a known cylinder and sector location at which airbearing resonance activity resulted due to the presence of the manufactured surface bump. A typical airbearing resonance frequency for purposes of this illustrative example is on the order of about 140 kHz to about 165 kHz. It can be seen in FIG. 5 that the low frequency sinusoidal signal characteristics associated with typical airbearing resonance activity have been suppressed due to the highpass filtering behavior of the AE module.

In FIG. 5, thirteen windows 160 are shown, each of which contains 16 signal samples, such that the segmented window length, M1, is given as M1=16. The windows 160 are shown to have a center-to-center separation of M2=78 samples. The sum of the samples in each sliding window 160 is computed by PSS unit 134, the values of which are displayed as dots in FIG. 6. The dots are sequenced in a restored thermal sequence, r(i), by PSS unit 134. The sampling rate of the restored thermal sequence, r(i), is given as $f_r = f_q/M2 = 1.28$ MHz.

The dots in sliding windows 160 are connected through an interpolation technique employed by up-sampler/interpolator 136 at a sampling rate of $f_s$, =100 MHz. The characteristic sinusoidal nature of the restored up-sampled thermal signal, s(j), is clearly evident in FIG. 6. FIG. 6 thus clearly illustrates a successful reconstruction of the thermal signal component, which evidences airbearing resonance, through application of a periodic segmented summation methodology of the present invention.

Figure 7:
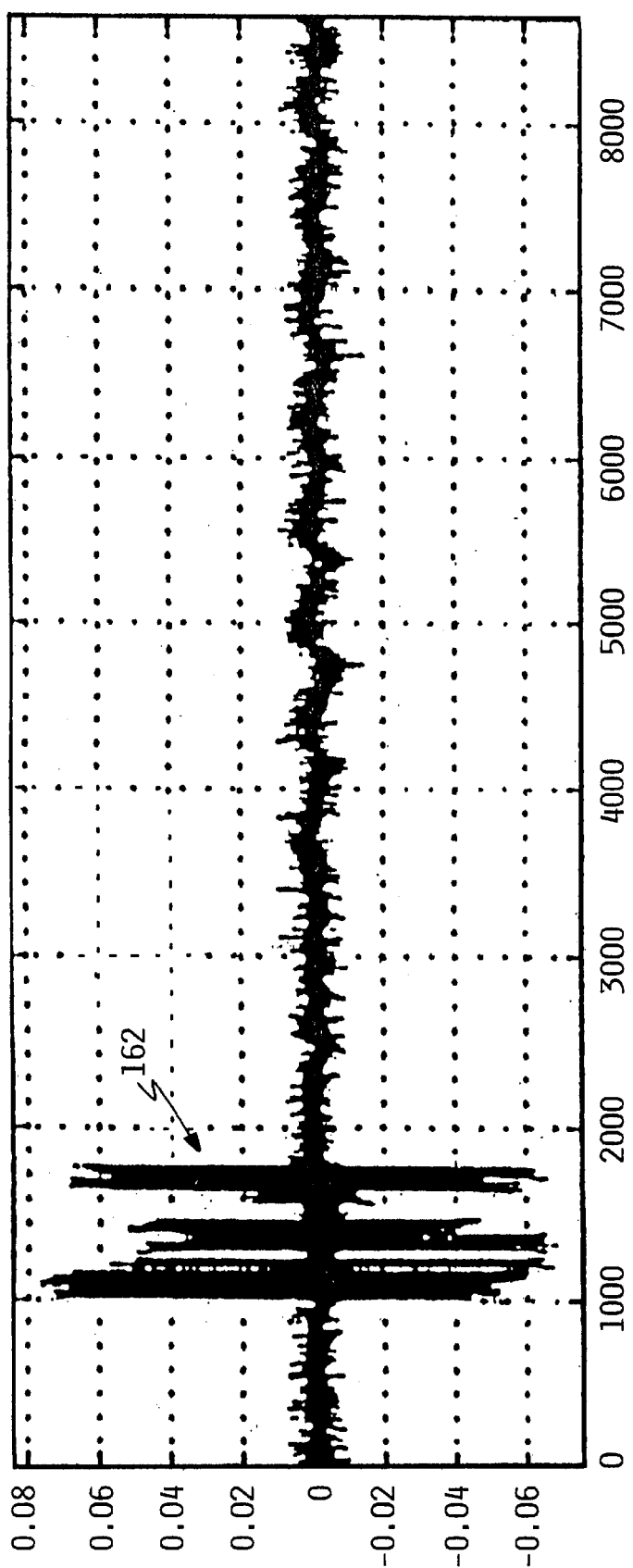
FIG. 7 illustrates a portion of a highpass filtered MR readback signal response, including a servo sector, which is associated with airbearing resonance due to the presence of a manufactured bump on the surface of a data storage disk, with all appreciable airbearing resonance activity being suppressed due to highpass filtering of the MR readback signal.
Figure 8:
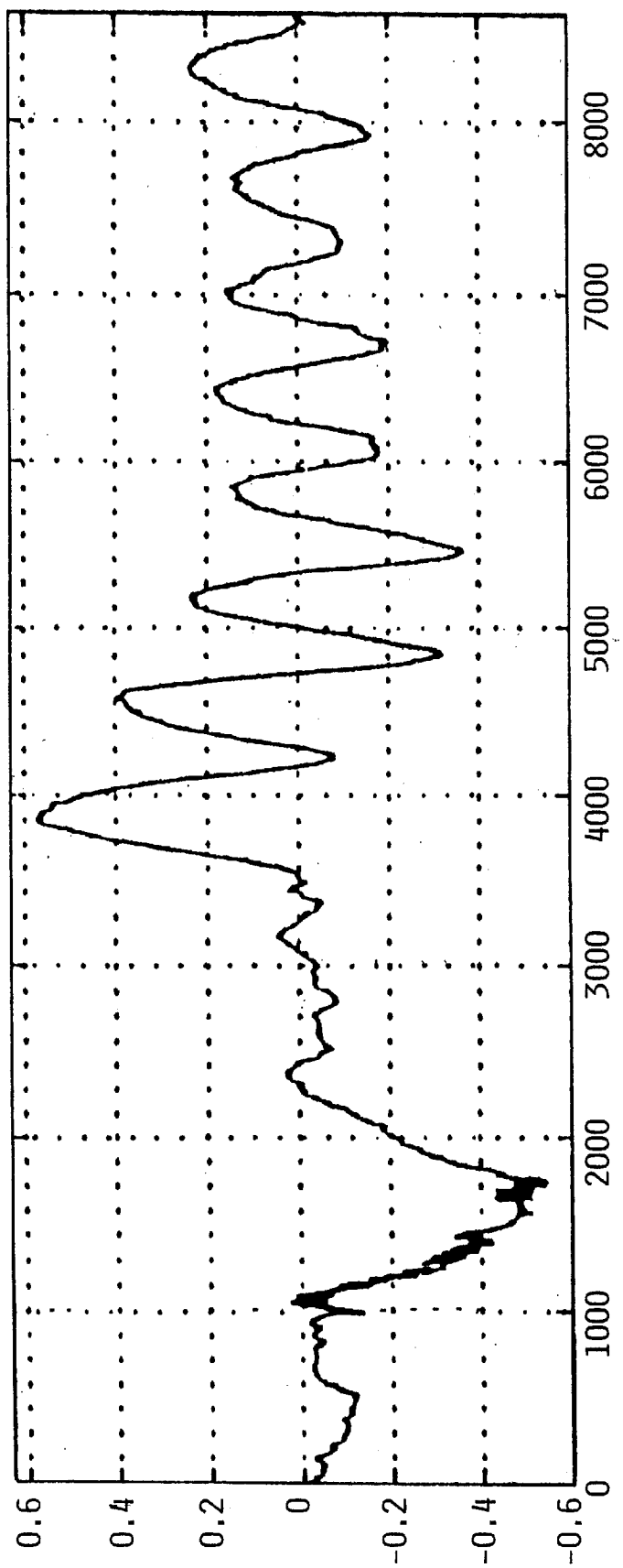
FIG. 8 depicts a simple trapezoidal integration of the waveform shown in FIG. 7.
Figure 9:
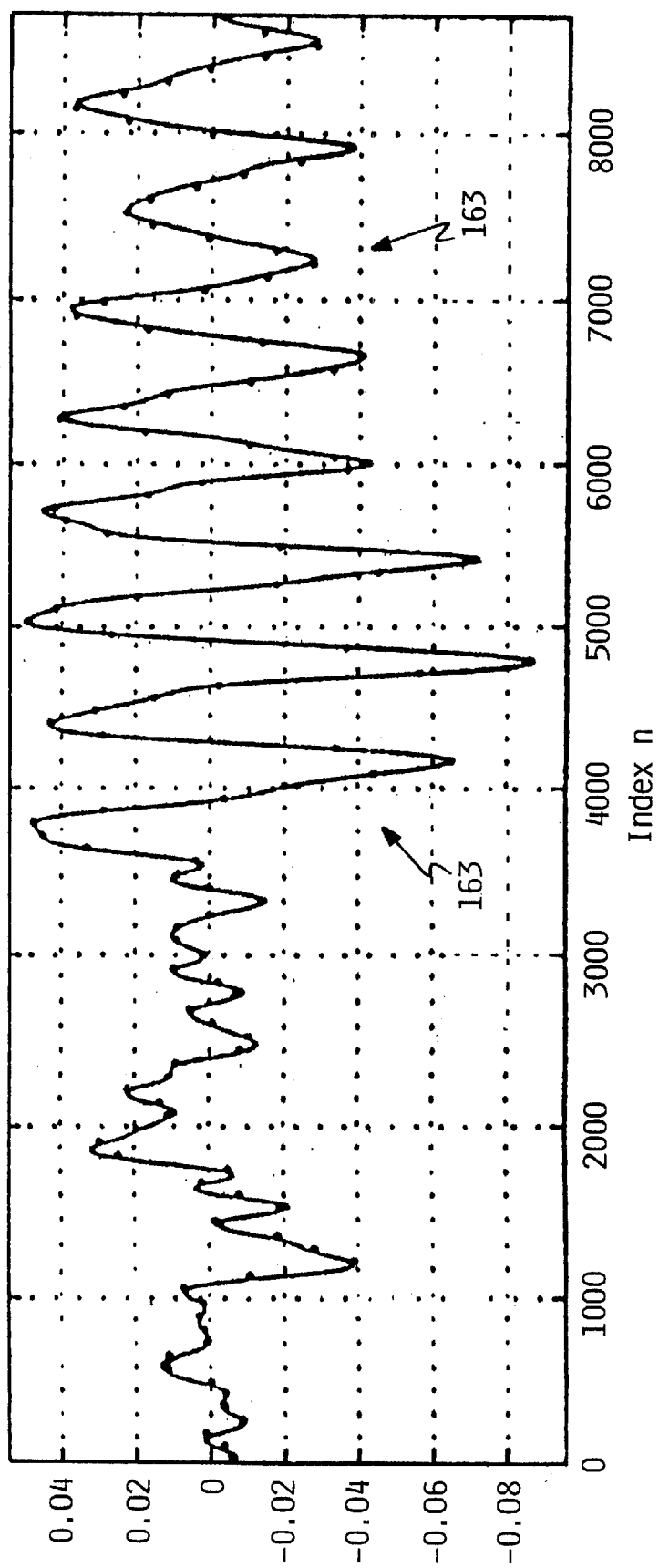
FIG. 9 illustrates a restored thermal signal produced using the novel periodic segmented summation techniques of the present invention, the restored thermal signal clearly evidencing airbearing resonance.

FIGS. 7–9 illustrate larger portions of an AE highpass filtered MR readback signal response associated with airbearing resonance due to the presence of a manufactured surface bump. A servo sector is clearly visible in region 152 of FIG. 7, while all appreciable airbearing resonance activity is suppressed due to AE highpass filtering of the MR readback response.

FIG. 8 depicts a simple trapezoidal integration of the waveform shown in FIG. 7, but also shows low frequency shifts and modulation in the integrated signal, thereby making this signal unsuitable for amplitude detection purposes. FIG. 9, in contrast, illustrates a restored thermal signal that was produced using the novel periodic segmented summation techniques of the present invention. The restored thermal signal shown in FIG. 9, which clearly shows airbearing resonance 163, is particularly well-suited for defect detection and disk surface analysis purposes.

In accordance with another embodiment of the present invention, and as further illustrated in FIG. 4, magnetic signal, y(t), produced at the output of AE module 103 shown in FIG. 3, may be subject to periodic segmented summation processing for purposes of extracting a thermal signal from the magnetic readback signal. During general disk drive system operation, the magnetic readback signal, y(t), is processed by a recording channel 150 in a conventional manner and is communicated to a host data bus 159 in the form of a binary signal (0,1) for downstream processing.

In accordance with this embodiment of the present invention, portion 121 of system 110 employs a recording channel analyzer 154 which is coupled to the recording channel 150. Recording channel analyzer 154 represents a signal analysis facility which is typically employed during testing and manufacturing for purposes of evaluating head flying characteristics and other operational characteristics of the data storage system. Within the context of the present invention, recording channel analyzer 154 represents a device which is capable of summing certain categories of equalized readback signal samples within specified sliding windows.

By way of example, Partial Response Maximum Likelihood Ratio (PRML)-like recording channels use three levels of signal samples for detection, which are categorized as "+1's", "0's", and "−1's " (i.e., ternary signals). Recording channel analyzer 154 can, for example, perform summation operations for adding up the "+1" sample values or the "−1" sample values within a specified sliding window. U.S. Pat. No. 5,168,413 discloses an analysis facility, referred to as a Generalized Electronic Measurement (GEM) facility, which may be implemented as recording channel analyzer 154. U.S. Pat. No. 5,168,413 is incorporated herein by reference in its entirety.

Recording channel 150 comprises a number of components, including a PRML filter 151, a sampling switch 152, a ternary detector 153, and a Viterbi detector 155. The Viterbi detector 155 is a known detector that effectively converts a ternary signal (+1,0,−1), received from PRML filter 151 and sampled by sampling switch 152, to a binary (0,1) signal. According to the present embodiment, the ternary signal produced by ternary detector 153 is also communicated to recording channel analyzer 154 via ternary signal bus 157.

For purposes of extracting a thermal signal from the magnetic readback signal, y(t), recording channel analyzer 154 may be programmed to allow for adding up the "+1" sample values and subtracting them from the sum of the "−1" sample values within the same sliding window. This processing capability generally corresponds to the process associated with segmented summation for one sliding window discussed previously with respect to portion 123 of system 110.

Assuming that recording channel 150 uses three levels of signal samples, namely "+1's", "0's", and "−1's", for detection, three binary masks may be defined for this ternary signal scheme. Within such a ternary signal scheme, signal values exceeding a given positive threshold are defined as "+1" values, signal values exceeding (i.e., more negative) a given negative threshold are defined as "−1" values, and signal values falling between the positive and negative thresholds are defined as "0" values.

The binary mask associated with "+1" signal values comprise binary "1's" when the signal exceeds the positive threshold and binary "0's" when the signal is below the positive threshold. The binary mask associated with "−1" signal values comprise binary "1's" when the signal exceeds the negative threshold and binary "0's" when the signal is below, or less negative than, the negative threshold. The binary mask associated with "0" signal values comprises binary "1's" when the signal falls between the positive and negative thresholds and binary "0's" when the signal exceeds the positive or negative threshold. The three masks used by PSS unit 156 are mutually exclusive.

It may be desired or required that the periodic segmented summation technique using the equalized magnetic readback signal, y(t), be performed over multiple data storage disk revolutions. However, non-repeatable baseline modulation may cause problems if multiple revolutions are used. Therefore, storing longer sequences of the sliding window segmented data samples for one data sector within the same revolution will allow for the complete emulation of the PSS process. PSS unit 156 extracts the thermal signal from the magnetic readback signal, y(t), of the MR transducer using these longer sequences. Generally, sequences on the order of less than 4,000 samples may be used.

By way of example, using a sliding window having a length of M1=16, a periodicity of M2=78, and 8 summed samples within 1 airbearing resonance cycle at a frequency of $f_{air}$=160 kHz would require about N=1840 "+1" sample values and 1840 "−1" sample values over a $T_{sec}$=90 µs data sector, where N is calculated as N=8*M1*$f_{air}$*$T_{sec}$. The sliding windows would preferably be concatenated together for post-processing using the PSS method.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A method of processing a signal obtained from a storage medium using a magnetoresistive (MR) element, the method comprising:

obtaining the signal from the storage medium using the MR element, the signal comprising a thermal component representing a thermal response of the MR element;

filtering the signal so as to degrade the thermal component of the signal;

sampling the filtered signal to produce samples of the filtered signal;

applying a sliding window comprising a series of binary values to groups of the signal samples to produce a plurality of signal sample values for each of the signal sample groups; and summing the signal sample values for each of the signal sample groups to produce a restored thermal signal substantially representative of the thermal component of the signal obtained from the storage medium.

2. The method of claim 1, wherein the binary values of the window comprise a series of binary zeros and binary ones, an ordering of the series of binary zeros and binary ones differing for each of the groups of the signal samples.

3. The method of claim 1, wherein the window has a preestablished length, and the signal sample groups are separated by a preestablished number of signal samples.

4. The method of claim 1, wherein the window is applied to the signal samples so as to slide the window by a preestablished number of signal samples.

5. The method of claim 1, wherein applying the window comprises multiplying the series of binary values defining the window with the signal samples of each of the signal sample groups.

6. The method of claim 1, further comprising storing the summed signal sample values as a sequence of summed values, the summed values representative of portions of the restored thermal signal.

7. The method of claim 1, further comprising using interpolation on the summed signal sample values to produce the restored thermal signal.

8. The method of claim 1, wherein filtering the signal comprises highpass filtering the signal so as to degrade the thermal component of the signal.

9. The method of claim 1, further comprising detecting a surface feature o f the s storage medium using the restored thermal signal.

10. The method of claim 1, wherein the signal obtained from the storage medium further comprises a magnetic component, the method further comprising producing a ternary signal using the signal obtained from the storage medium and sampling the ternary signal to produce samples of the ternary signal, further wherein:

applying the sliding window further comprises applying the window to groups of the ternary signal samples to produce a plurality of signal sample values for each of the ternary signal sample groups; and summing the signal sample values further comprises summing the signal sample values for each of the ternary signal sample groups to produce a restored thermal signal substantially representative of the thermal component of the signal obtained from the storage medium.

11. The method of claim 1, wherein the signal obtained from the storage medium further comprises a magnetic component and a thermal component and, filtering the signal further comprises highpass filtering the signal so as to degrade the thermal component of the signal, the method further comprising lowpass filtering subsequent to highpass filtering the signal.

12. A signal processing apparatus for an information storage device including an information storage medium, comprising:

a transducer, including a magnetoresistive (MR) element, for reading a signal from the storage medium, the signal comprising a thermal component representing a thermal response of the MR element;

an amplification circuit, coupled to the transducer, that alters the signal such that the thermal component is degraded;

a sampling circuit, coupled to the amplification circuit, that samples the altered signal to produce samples of the altered signal; and a processor, coupled to the sampling circuit, that applies a sliding window comprising a series of binary values to groups of the signal samples to produce a plurality of signal sample values for each of the signal sample groups, the processor summing the signal sample values for each of the signal sample groups to produce a restored thermal signal substantially representative of the thermal component of the signal obtained from the storage medium.

13. The apparatus of claim 12, wherein the binary values of the window comprise a series of binary zeros and binary ones, and the processor applies the window to the signal samples such that an ordering of the series of binary zeros and binary ones differs for each of the groups of the signal samples.

14. The apparatus of claim 12, wherein the window has a preestablished length, and the processor slides the window by a preestablished number of signal samples.

15. The apparatus of claim 12, wherein the processor applies the window to the signal samples by multiplying the series of binary values defining the window with the signal samples of each of the signal sample groups.

16. The apparatus of claim 12, wherein the processor stores the summed signal sample values as a sequence of summed values in a memory, the summed values representative of portions of the restored thermal signal.

17. The apparatus of claim 12, wherein the process performs interpolation on the summed signal sample values to produce the restored thermal signal.

18. The apparatus of claim 12, wherein the amplification circuit exhibits a highpass filtering behavior that degrades the thermal component of the signal.

19. The apparatus of claim 12, wherein the processor detects a surface feature of the storage medium using the restored thermal signal.

20. The apparatus of claim 12, wherein the signal obtained from the storage medium further comprises a magnetic component.

21. The apparatus of claim 12, wherein the amplification circuit is provided within an arm electronics circuit that exhibits a highpass filtering behavior.

22. The apparatus of claim 12, wherein the signal obtained from the storage medium further comprises a magnetic component and the amplification circuit exhibits a highpass filtering behavior that degrades the thermal component of the signal, the apparatus further comprising a lowpass filter coupled to an output of the amplification circuit.

23. The apparatus of claim 12, wherein:

the signal obtained from the storage medium further comprises a magnetic component;

the sampling circuit is coupled to a ternary detector which receives a sampled ternary signal from the sampling circuit; and the processor applies the window to the groups of the ternary signal samples to produce a plurality of signal sample values for each of the ternary signal sample groups, the processor further summing the signal sample values for each of the ternary signal sample groups to produce a restored thermal signal substantially representative of the thermal component of the signal obtained from the storage medium.

24. The apparatus of claim 23, wherein the processor is a processor of a recording channel analyzer.

25. An information storage device, comprising:

a storage medium;

a transducer, including a magnetoresistive (MR) element, for reading a signal from the storage medium, the signal comprising a thermal component representing a thermal response of the MR element;

an apparatus for moving at least one of the transducer and the medium to provide relative movement between the transducer and the medium;

an amplification circuit, coupled to the transducer, that alters the signal such that the thermal component is degraded;

a sampling circuit, coupled to the amplification circuit, that samples the altered signal to produce samples of the altered signal; and a processor, coupled to the sampling circuit, that applies a sliding window comprising a series of binary values to groups of the signal samples to produce a plurality of signal sample values for each of the signal sample groups, the processor summing the signal sample values for each of the signal sample groups to produce a restored thermal signal substantially representative of the thermal component of the signal obtained from the storage medium.

26. The device of claim 25, wherein the binary values of the window comprise a series of binary zeros and binary ones, and the processor applies the window to the signal samples such that an ordering of the series of binary zeros and binary ones differs for each of the groups of the signal samples.

27. The device of claim 25, wherein the window has a preestablished length, and the processor slides the window by a preestablished number of signal samples.

28. The device of claim 25, wherein the processor applies the window to the signal samples by multiplying the series of binary values defining the window with the signal samples of each of the signal sample groups.

29. The device of claim 25, wherein the processor stores the summed signal sample values as a sequence of summed values in a memory, the summed values representative of portions of the restored thermal signal.

30. The device of claim 25, wherein the processor performs interpolation on the summed signal sample values to produce the restored thermal signal.

31. The device of claim 25, wherein the amplification circuit exhibits a highpass filtering behavior that degrades the thermal component of the signal.

32. The device of claim 25, wherein the processor detects a surface feature of the storage medium using the restored thermal signal.

33. The device of claim 25, wherein the signal obtained from the storage medium further comprises a magnetic component.

34. The device of claim 25, wherein the amplification circuit is provided within an arm electronics circuit that exhibits a highpass filtering behavior.

35. The device of claim 25, wherein the signal obtained from the storage medium further comprises a magnetic component and the amplification circuit exhibits a highpass filtering behavior that degrades the thermal component of the signal, the apparatus further comprising a lowpass filter coupled to an output of the amplification circuit.

36. The device of claim 25, wherein:

the signal obtained from the storage medium further comprises a magnetic component;

the sampling circuit is coupled to a ternary detector which receives a sampled ternary signal from the sampling circuit; and the processor applies the window w to the groups of the ternary signal samples to produce a plurality y of signal sample values for each of the ternary signal sample groups, the processor further summing the signal sample values for each of the ternary signal sample groups to produce a restored thermal signal substantially representative of the thermal component of the signal obtained from the storage medium.

37. The device of claim 36, wherein the processor is a processor of a recording channel analyzer.

* * * * *

UNITED STATES PATENT AND TRADEMARK OFFICE
CERTIFICATE OF CORRECTION

PATENT NO.    : 6,392,841 B1
DATED         : May 21, 2002
INVENTOR(S)   : Hal Hjalmar Ottesen and Gordon James Smith It is certified that error appears in the above-identified patent and that said Letters Patent is hereby corrected as shown below:

<u>Column 12,</u>
Line 42, replace "o f" with -- of -- and delete "s" after "the".

<u>Column 16,</u>
Line 1, delete "w" after "window".
Line 2, delete "y" after "plurality".

Signed and Sealed this

Eighth Day of October, 2002

*Attest:*

JAMES E. ROGAN
*Attesting Officer*          *Director of the United States Patent and Trademark Office*